UNITED STATES PATENT OFFICE.

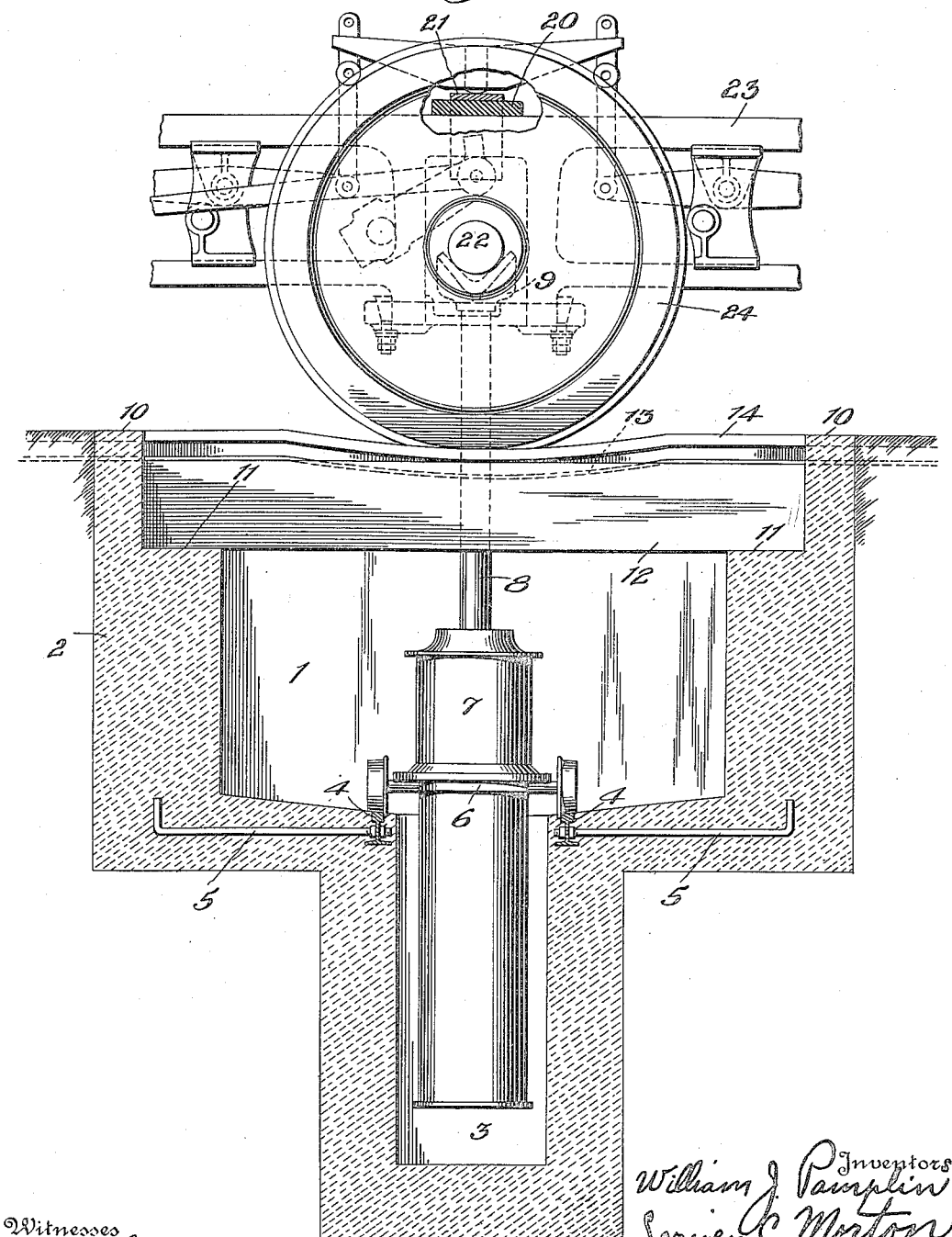

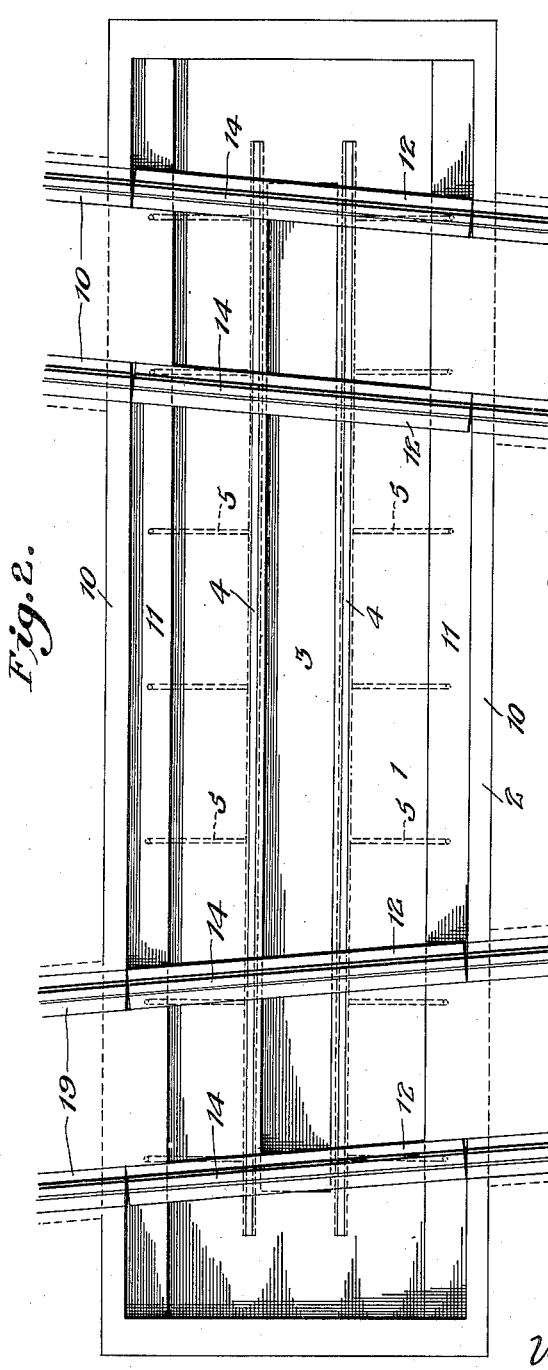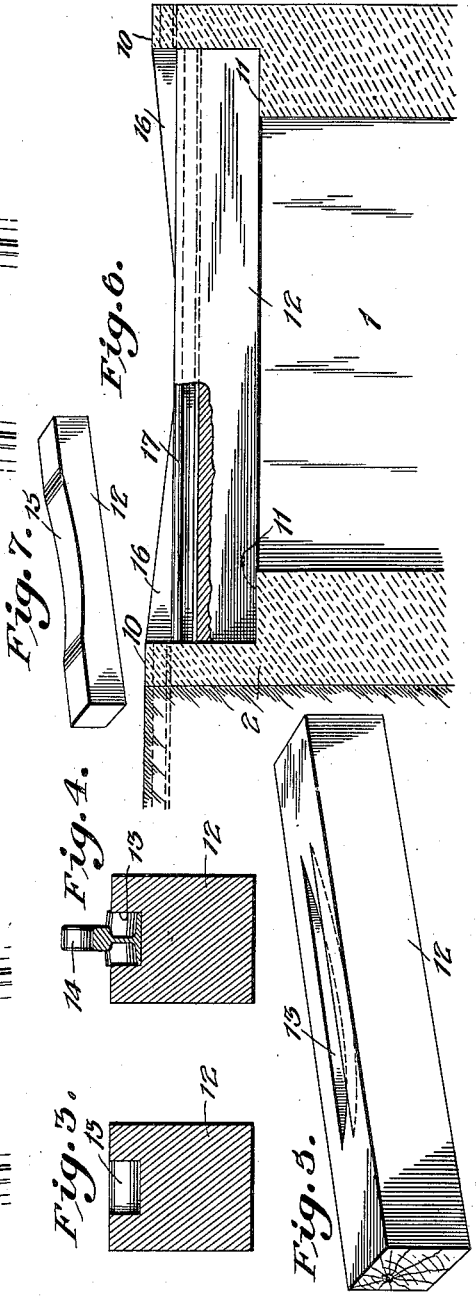

WILLIAM J. PAMPLIN AND SCRIVEN C. MORTON, OF WAYCROSS, GEORGIA, ASSIGNORS OF ONE-THIRD TO CONRAD L. MEISTER, OF WILMINGTON, NORTH CAROLINA.

MEANS FOR LOWERING AND REMOVING LOCOMOTIVE-WHEELS.

1,163,105.  Specification of Letters Patent.  Patented Dec. 7, 1915.

Application filed October 9, 1915. Serial No. 55,039.

*To all whom it may concern:*

Be it known that we, WILLIAM J. PAMPLIN and SCRIVEN C. MORTON, citizens of the United States, and residents of Waycross, county of Ware, and State of Georgia, have made and invented certain new and useful Improvements in Means for Lowering and Removing Locomotive-Wheels, of which the following is a specification.

Our invention relates to new and useful improvements for lowering and removing car wheels, trailer wheels, car trucks, and more particularly to a construction especially adapted for lowering and moving the driving wheels of locomotives.

As is well known the driving wheels and axle of a locomotive are of relatively great weight and the present manner of removing them for repair necessitates a great amount of labor and time.

The method now used for removing the wheels from the locomotive and in general practice in all the locomotive and repair shops, is to first roll the engine on pit beams on which is secured a straight piece of track, then jack the entire engine to a height whereby the weight will be removed off the wheels which are to be lowered, then support the wheels by placing a drop pit jack in position thereunder, raising the wheels and necessarily their axles slightly off the rails by means of the said jack, then removing the drop pit beams from under the wheels, lowering the axle and wheels into the pit, moving them to one side and then raising them again to the floor level, again place the jack pit beams under the said wheels and move them into the shop for the necessary repairs.

By our construction as shown in the drawings and to be fully hereafter described it is unnecessary to jack up the entire engine, thereby saving a great amount of labor.

An object of our invention therefore is to provide a construction whereby first a block is placed under the springs and spring saddle and equalizers, so that the weight of the locomotive will not come upon the axle and wheels to be lowered, moving the locomotive over a pit so that the axle and wheels will be slightly lowered and the weight of the locomotive that naturally falls on the said driving wheels and said axle falls upon the side frames of the said locomotive; raising the wheel and axle again slightly so that the drop pit beams may be removed, lowering the wheels from beneath the locomotive and moving them transversely to said locomotive, and again raising them to the floor level so that they may be moved into the shop for repairs.

Many other objects and improvements will appear as the description proceeds.

In the drawings, Figure 1 is a transverse sectional view of the pit, the wheels being in elevation, and a part thereof being broken away for the matter of clearness. Fig. 2 is a top plan view of the pit and showing the primary and transverse tracks. Fig. 3 is a sectional view of the drop pit beam. Fig. 4 is also a sectional view thereof, showing the track portion in position. Fig. 5 is a perspective view of the beam showing clearly the depressed portion. Fig. 6 is a transverse sectional view of the pit and a modified form of the pit beam. Fig. 7 is also a further modified form of the pit beam.

Referring now to the drawings (Figs. 1 and 2) a pit 1 is shown which is preferably lined with cement as at 2 and which pit has a central well portion 3 extending the entire length thereof and securely fastened at the sides of the well portion 3, are rails 4 which may be held by the anchor rods 5 although any effective form of holding these rails may be used. Located within the pit and adapted to move on the rails 4 is a truck 6 which carries a hydraulic jack 7, the lower portion of said jack extending downwardly in the well portion 3 of the pit 1 and this jack on the truck may be moved on the rails from one end of the pit to the other and it will be understood that any form of hydraulic jack may be carried on the truck 6. This jack is provided with the plunger 8 and on the upper end of which is secured the bearing or saddle 9.

The upper portion of the pit 1 is reduced as at 10 to form a ledge 11 on which may rest the drop pit beams 12, as shown in Figs. 1, 2 and 6.

One form of beam as shown in Figs. 3, 4 and 5 comprises a heavy timber having a depressed or cut out longitudinal central portion as shown at 13, and also extending longitudinally of this beam 12 is a section or portion of a rail 14 which is bent downwardly to follow the curvature of this central depressed portion 13, so that there will be a dip or lowering of this rail extending nearly from each end of the said beam to the center thereof.

A slightly modified form of pit beam is shown in Fig. 7 and in this instance the beam may be a solid and unitary casting and having a portion of the upper surface depressed as at 15, the depression extending longitudinally of said beam and from a point near the opposite ends thereof.

In Fig. 6, another form of beam is shown in this instance having a groove or depression formed throughout the length thereof in the upper surface and in which is a rail 17 and located on the top thereof are two wedge shape members 16, the apexes thereof extending toward each other. These members 16 are also provided with a track portion on their upper surface and fit or are placed directly on the rail 17 which extends within the hollow or grooved portion above mentioned.

Extending transversely to the pit 1 are the two primary pairs of tracks 18 and 19 and registering therewith and extending across the pit are the pit beams 12.

The operation for removing the driving wheels with the above construction is as follows:—A block 20 of sufficient size and strength is first placed under the springs and spring saddles as at 21 so that the weight is relieved from the axle 22 and transferred to the side frame 23. The locomotive is then rolled across the pit and the wheels 24 spotted or located centrally over the pit and naturally drop slightly when they are on the sunken or lowered portion of the pit beams, the plunger of the hydraulic jack is then raised so that the same will support the said axle 22 and the wheels 24 and is again slightly raised so that the pit beams 12 may be removed. The plunger of the jack now supporting the axle and wheels is lowered so that the said driving wheels will clear the under surface of the said locomotive and the truck supporting the said hydraulic jack is then moved longitudinally of the pit to the other end thereof and the axle and driving wheels again raised slightly above the level of the second set of primary tracks 19. The pit beams are placed thereunder and the jack again lowered so that the driving wheels now rest upon the pit beams of the second set of primary tracks and they may then be rolled to any convenient place to be repaired.

From the foregoing it will be seen that the labor is reduced nearly one half, as instead of jacking up the entire locomotive the wheels are first relieved of the weight by a chock or block and it is then only necessary to raise the wheels and axles by the jack and then lower them, etc.

We are aware that separate trucks have been used to support a car but these trucks all necessitate an extra pair of tracks extending parallel with the primary tracks and necessitating a relatively great amount of labor to get the said trucks etc. in position.

By the use of drop pit beams with centrally located depressions and providing a pit and jack and transverse track as described the wheels may be easily lowered, raised, moved transversely and doing away with the jacking of the entire engine.

Many slight forms and modifications may be made without departing from the spirit and scope of the invention.

Having thus described our invention what we claim as new and desire to secure by Letters Patent is:—

1. Means for removing an axle from a locomotive frame comprising a track for the locomotive, a second track positioned under the first mentioned track and disposed transversely thereof, a section provided with a synclinal upper surface, means for removing the weight of the frame of the locomotive from the axle, means mounted on the second mentioned track for lowering the axle with relation to the frame and for sustaining the weight of the axle whereby the said section may be removed from under the same, the last mentioned means being movable along the second mentioned track whereby the axle may be removed from under the locomotive frame.

2. Means for removing an axle from a locomotive frame comprising a track for the locomotive, a second track positioned under the first mentioned track and disposed transversely thereof, a pit beam adapted to register with said first mentioned track and having its upper portion provided with synclinal surfaces, means for removing the weight of the frame of the locomotive from the axle, means mounted on the second mentioned track for lowering the axle with relation to the frame and for sustaining the weight of the axle whereby the said beam may be removed from under the same, the last mentioned means being movable along the second mentioned track whereby the axle may be removed from under the locomotive frame.

3. Means for removing an axle from a locomotive frame comprising a track for the locomotive, a second track positioned under the first mentioned track and disposed transversely thereof, a pit beam adapted to register with said first mentioned track and having a central longitudinally extending depressed portion, means for removing the weight of the frame of the locomotive from the axle, means mounted on the second mentioned track for lowering the axle with the relation to the frame and for sustaining the weight of the axle whereby the said pit beam may be removed from under the same, the last mentioned means being movable along the second mentioned track whereby the axle may be removed from under the locomotive frame.

4. Means for removing the axle from a locomotive frame comprising two sets of primary tracks, a second track positioned under the first mentioned sets of tracks and disposed transversely thereof, a plurality of pit beams having a longitudinally extending central depressed portion, means for removing the weight of the frame of the locomotive from the axle, a jack movable on the second mentioned track for lowering the axle with relation to the frame and for sustaining the weight of the axle whereby the said pit beams may be removed from under the same, a truck carrying said jack and movable along the second mentioned track whereby the axle may be removed from under the locomotive frame and placed on pit beams, registering with the other set of primary tracks.

5. Means for removing an axle and wheels comprising in part a pit beam provided with synclinal upper surfaces, said surfaces extending longitudinally of said pit beam and from a point near the opposite ends thereof.

6. Means for lowering an axle and wheels comprising in part a pit beam having a depressed longitudinally extending central portion.

7. Means for lowering an axle and wheels comprising in part a pit beam provided with a centrally located groove in its upper portion and wedge shaped members adapted to rest on said pit beam, the apex of the one wedge extending toward the apex of the other wedge.

8. The method for removing an axle from a locomotive frame consisting of first relieving the said axle of the weight of the locomotive, second, lowering the said axle and wheels thereon, third, additionally supporting said axle and wheels, fourth removing the primary means of support of said axle and wheels, fifth, lowering said axle and said wheels and moving them transversely to the frame of said locomotive.

9. The method of removing an axle and wheels from a locomotive consisting in first relieving the axle and wheels of the weight of said locomotive, lowering said axle and said wheels, placing additional support under said axle and said wheels, removing the primary support for said axle and said wheels, lowering said axle and said wheels and moving them transversely to the frame of said locomotive raising said axle and said wheels and placing them in position to be readily moved.

Signed at Waycross, Ga., this 1st day of October, A. D. 1915.

WILLIAM J. PAMPLIN.
SCRIVEN C. MORTON.

Witnesses:
J. M. Pearsall,
J. C. Pittman.